Dec. 16, 1969  P. K. CHURCH  3,484,678
LINEAR DIFFERENTIAL TRANSFORMER TRANSDUCER WITH NONMAGNETIC CORE
Filed Jan. 27, 1966

INVENTOR.
PETER K. CHURCH
BY
Anderson, Spangler & Wynne
ATTORNEYS

Dec. 16, 1969     P. K. CHURCH     3,484,678
LINEAR DIFFERENTIAL TRANSFORMER TRANSDUCER WITH NONMAGNETIC CORE
Filed Jan. 27, 1966     3 Sheets-Sheet 2

INVENTOR.
PETER K. CHURCH
BY
Anderson, Spangler & Wymore
ATTORNEYS

Dec. 16, 1969  P. K. CHURCH  3,484,678
LINEAR DIFFERENTIAL TRANSFORMER TRANSDUCER WITH NONMAGNETIC CORE
Filed Jan. 27, 1966  3 Sheets-Sheet 3

INVENTOR.
PETER K. CHURCH
BY
Anderson, Spangler & Wymore
ATTORNEYS 3,484,678
LINEAR DIFFERENTIAL TRANSFORMER TRANSDUCER WITH NONMAGNETIC CORE
Peter K. Church, Cascade, Colo., assignor, by mesne assignments, to Kaman Sciences Corporation, Colorado Springs, Colo., a corporation of Delaware
Continuation-in-part of application Ser. No. 250,180, Jan. 8, 1963. This application Jan. 27, 1966, Ser. No. 523,363
Int. Cl. H02p 13/10
U.S. Cl. 323—51     12 Claims

ABSTRACT OF THE DISCLOSURE

Linear differential transformer transducer with a movable nonmagnetic core wherein the core is at least in part electrically conductive and which operates on the eddy current principle. May be connected directly to low impedance circuits and is useful over a wide range of temperatures displaying minimum output shift while displaying continuous output resolution and excellent high frequency response.

---

This application is a continuation-in-part of applicant's application Ser. No. 250,180 filed Jan. 8, 1963, now U.S. Patent No. 3,238,479.

Prior art devices have generally relied upon the use of the variable reluctance or variable capacitance principles or have utilized strain gages to detect movement and convert same into measurable electrical signals proportional to such movement.

One type of position transducer which has been previously used for the measurement of displacement utilizes the variable reluctance principle. A movement sensitive element of magnetic material is positioned in spaced relation to a pole piece of magnetic material supporting a coil of wire. When the element is moved with relation to the pole piece, the change in inductance and reluctance in the coil induces electrical pulses into the coil. A pair of coils, with one positioned to either side of the magnetic element and connected into a bridge circuit will effect a measurable unbalance therein as a function of the movement of the element.

The differential transformer which has been used heretofore for producing an electrical output proportional to the displacement of a body also utilizes the variable reluctance principle. For example, the differential transformer generally includes a movable slug member of a magnetic material adapted to be moved in accordance with a measured function. The movable slug member is generally disposed between the primary and secondary coils of the transformer and provides a path for magnetic flux linking the coils. The secondary coil of the transformer generally includes a pair of substantially similar windings usually connected in series opposition or bucking relationship.

When the primary coil of the transformer is energized with alternating current, voltages are induced in the two secondary coils. Where the two secondary coils are connected in series opposition, the two voltages induced in the two coils are opposite in phase. For one position of the magnetic slug member, known as the null position, equal voltages are induced in the two secondary coils resulting in a net zero output. When the slug is positioned for zero output volts, the core is said to be at the balance point or null position.

When the slug member is moved from the null position, the voltage induced in the secondary coil towards which the slug is moved increases, while the voltage induced in the secondary coil from which the coil moves decreases. These variations in induced voltages are due to the variations in the magnetic flux path between the primary coil and the respective secondary coils caused by the relative movement of the slug member. When the slug member is thus moved from its null position, a differential output voltage across the output circuit of the transformer results. With proper design, the output voltage from the transformer varies linearly with a change in the slug position as long as the slug is operating within its linear range. Motion of the slug member in the opposite direction beyond the null position produces a similar voltage characteristic across the output circuit of the transformer, but with the phase shifted 180°.

These prior art devices using magnetic circuits have serious drawbacks in that the permeability of the magnetic components is temperature sensitive; the frequency response of these devices are seriously limited and the amplitude of the output signals available, using low mass slugs, are necessarily low requiring further amplification for efficient utilization.

It is an important object of this invetnion, therefore, to provide improved transducer devices which avoid one or more of the disadvantages of the prior art arrangements and which provide high output sensitivities.

It is a further object of this invention to provide an improved transducer which will provide a minimum output shift when subjected to a wide range of temperatures.

It is a further object of this invention to provide an improved transducer having superior high frequency response characteristics.

It is a further object of this invention to provide an improved transducer with continuous output resolution over its entire operating range.

It is a further object of this invention to provide an improved transducer adapted for direct connection to low impedance circuits.

It is a further object of this invention to provide an improved transducer arrangement useful over a wide range of temperatures, being highly resistant to intense nuclear radiation and having improved vibration, acceleration, shock, non-linearity, hysteresis specifications.

It is a further object of this invention to provide an improved transducer arrangement, the output signal from which is substantially devoid of harmonic distortion.

A still further object of this invention is to provide an improved transducer which is economical and simple of construction and has but one moving part.

A further important object of this invention is to provide an improved transducer arrangement capable of having an essentially linear input-output relationship over a large range of movement as a measured function.

In accordance with the invention, the improved position transducer comprises a primary winding adapted to be connected to an AC generator to provide an electrical field. The transducer includes a first and second secondary winding connected to provide an output circuit. A slug member is provided of nonmagnetic, electrical conducting material with the first and second secondary windings being positioned with respect to the field generated by the primary winding such that an equal amount of power loss or change in effective impedance occurs in each of said first and second secondary windings when the nonmagnetic slug member is supported in a neutral or null position. The slug member is supported for movement in response to the movement to be detected and will vary the effective impedance of the output circuit as a function of such movement.

For a better understanding of the present invention, together with other and further objects thereof, reference is had to the following description taken in connection with the accompanying drawings and its scope will be pointed out in the appended claims.

Figure 1:
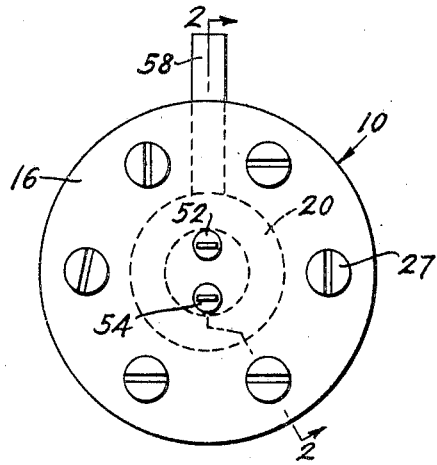
FIGURE 1 is a view in plan of one form of construction embodying the present invention.
Figure 2:
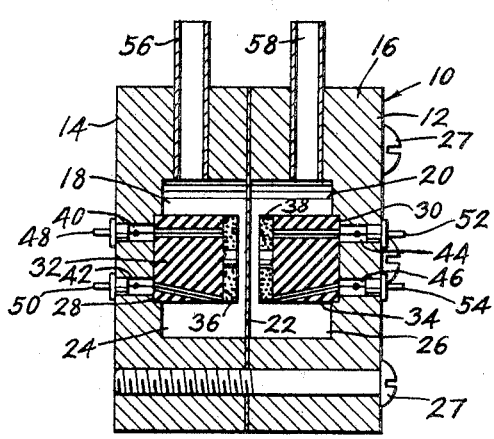
FIGURE 2 is a cross-sectional view taken at line 2—2 of FIGURE 1 showing the interior construction of a pressure sensitive transducer according to the invention.

Referring to FIGURES 1 and 2, there is shown an improved diaphragm type pressure transducer 10 that operates on what may be best termed a variable power loss, AC resistance or eddy current principle. This new concept allows the design and manufacture of transducers having material advantages over prior art devices. The transducer comprises a housing 12 made in two halves 14 and 16 each having a recess 18 and 20 therein. The housing halves have an electrical conducting, non-magnetic diaphragm 22 clamped therebetween, separating the space within the housing into two chambers 24 and 26 the whole being clamped together by screws 27 to effect pressure-tight joints between the several parts. The bottom of the recesses 18 and 20 are provided with recesses 28 and 30 into which coil forms or cores 32 and 24 of nonmagnetic, dielectric material are secured in a manner to provide a reasonably tight seal between the respective coil forms and the housing. Coil forms 32 and 34 are seen to support coils 36 and 38 thereon positioned in close proximity and to either side of diaphragm 22. The ends of coils 36 and 38 are connected to leads which may be formed integrally with the coil forms 32 and 34 or sealed therein in a suitable manner. The leads emerge from the bottom of each coil form into passageways 40, 42, 44 and 46 connecting the bottom of recesses 28 and 30 and the exterior of the housing. The outer ends of these passageways are sealed by an insulated electrical terminal 49, 50, 52 and 54 to provide a pressure-tight seal. The leads from the coil ends are connected to terminals 48, 50, 52 and 54 for connection to external electrical circuits.

Each half 14 and 16 of the housing is provided with pressure inlets 56 and 58 communicating respectively the inner chambers 24 and 26 to either side of diaphragm 22. When pressure is admitted to one of the pressure inlets, diaphragm 22 will be displaced toward an end surface of one coil while the distance between the other coil and the diaphragm will increase.

Figure 3:
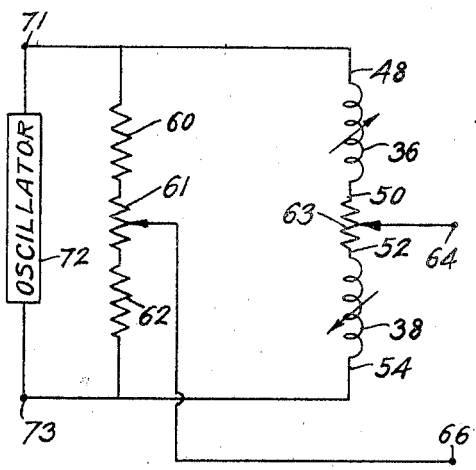
FIGURE 3 is a circuit arrangement including the transducer of FIGURES 1 and 2 directly coupled for AC output.

When the coils of the transducer are connected as two arms of an AC bridge such as shown in FIGURE 3, the output of the bridge will vary with a change in applied pressure. With the resistive arms 60 and 62 being equal and coils 36 and 38 being of equal inductance and configuration, as well as being positioned equidistant from the diaphragm, the bridge output across terminals 64 and 65 will be zero. If a pressure is applied to one side of the diaphragm through a pressure inlet to displace the diaphragm toward one coil, eddy current losses will increase in said one coil and decrease in the other producing an unbalance in the four arm bridge and an output signal representative of unbalance, due to the diaphragm position, will appear across terminals 64 and 66 which can be sensed and measured.

The transducer of this invention may be constructed entirely of non-magnetic materials avoiding the normal permeability change problems with change in temperature and harmonic distortion generation found in prior art devices requiring the presence of magnetic elements. The coils 36 and 38 are air core coils wound with insulated copper wire, anodized aluminum wire and the like. Diaphragm 22 may be made of beryllium copper or Phosphor bronze and like non-magnetic material for most applications whereas for other uses, a stainless steel diaphragm which has been plated with a thin layer of gold, silver, copper, aluminum, chromium, or other good electrical conductors in the area directly opposite the coil, generally identified as the "active area" of the diaphragm. The eddy current diaphragm must be of non-magnetic material and preferably, at least, the "active area" of the diaphragm is of a metal having good electrical conductivity. The greater the conductivity, the greater is the transducer output sensitivity.

The case 12 is preferably constructed of stainless steel or such other non-magnetic material having the requisite expansion rate and corrosion resistance characteristics.

The transducer design of FIGURES 1 and 2 may be provided with overload protection by extending the coil forms 32 and 34 to provide a stop for the diaphragm at a point of its travel just beyond the full range.

The transducer of this invention in using air core coils and avoiding the necessity of magnetic elements eliminates harmonic distortion being generated therein as is common to prior art devices. Further, the absence of magnetic elements allows much higher input frequencies to be utilized to advantage with higher frequency response being obtainable than with known devices.

The operation of the transducer of this invention is based upon the AC losses in the respective coils associated with eddy currents in the highly conductive element, which losses serve to unbalance an AC bridge including the coils, to produce an electrical output therefrom which is a function of the positioning of the element with respect to the coils. By proper selection of variables the output of the bridge can be made a linear function of the forces acting on the element.

The major categories of high frequency losses that must be considered for the coil-diaphragm configuration of FIGURES 1 and 2 are: the coil losses or power dissipated as heat in the coil windings; the power loss associated with the eddy currents produced in the metal diaphragm; the coil losses due to the proximity effect, the dielectric loss; and, and the loss in coil inductance because of close proximity of the diaphragm.

In considering the coil losses involved in the transducer of this invention, for DC circuits, the resistance of a conductor may be defined as:

(1) $$R = \rho' \frac{l}{A}$$

where:

R=resistance in ohms
$\rho$=resistivity in ohm-meters
$l$=length of conductor in meters
A=cross-sectional area of conductor in square meters However, as the frequency of the input current increases, the current distribution in the conductor becomes non-uniform. At high frequencies nearly all of the current will be concentrated very near the outer surface of the conductor. This phenomenon is commonly known as the "skin effect."

Because of the uneven current distribution across a conductor at high frequencies it will be necessary to consider the high frequency resistance as equal to the power dissipated divided by the square of the current, that is:

(2) $$R = PI^{-2} \text{ or } I^2R = P$$

Figure 6:
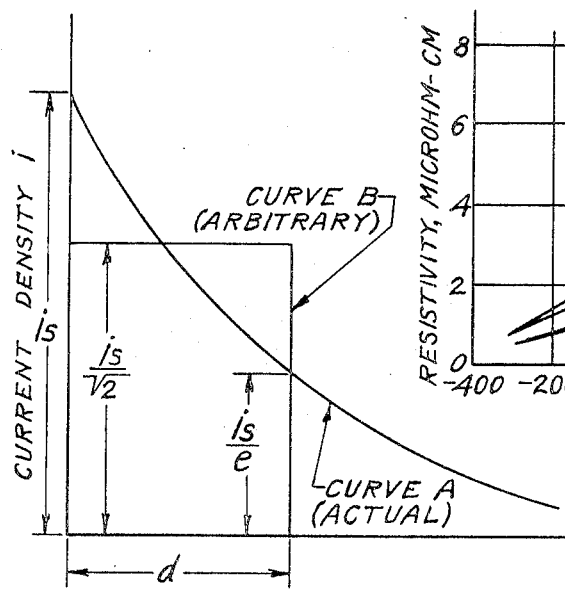
FIGURE 6 is a graphical representation of the current density as a function of depth below the surface of a conductor.

Current density at high frequencies will vary as a function of depth below the surface. As shown in FIGURE 6, the relationship of current density to depth of penetration is approximately exponential provided that the conductor is thick compared with the depth, $d$, at which the current density has decrease to $l/e$ of the surface value. The phase of the current varies directly as the depth, and at depth, $d$, lags the surface current by one radian.

It is more convenient to use an arbitrary current density with depth relationship rather than the actual, curve A, for theoretical consideration. Curve B assumes that the current density and phase are equal for a given depth below the conductor surface with no penetration below this depth. In this case, the height of the curve B must be $$\frac{1}{\sqrt{2}}$$

times the actual surface current density while the depth $d$, depicted by the curve, depends on the resistivity and permeability of the conductor as well as frequency. This arbitrary depth of penetration, $d$, is known as skin depth and may be expressed as:

(3) $$d = \sqrt{\frac{\rho}{\pi \mu f}}$$

where:

$d$=skin depth, meters
$\rho$=resistivity of conductor, ohm-meter
$\mu$=permeability, henries per meter, and
$f$=frequency, cycles per second Equations 1 and 3 can be used to obtain several important relationships for particular interest in the instant case. From Equation 3 it can be seen that the skin depth varies directly as the square root of the resistivity of the conductor and inversely as the square root of the frequency. Since the permeability of copper, silver or other nonmagnetic conductors that would be used in the transducer is very nearly equal to 1, the permeability term can be neglected for all practical purposes.

By substituting the skin depth, Equation 3, multiplied by a constant K, for the cross-sectional area in Equation 1 gives the relation:

(4) $$R = K\rho l \left(\frac{\pi f}{\rho}\right)^{1/2}$$

Equation 4 shows that the high frequency resistance is proportional to the square root of the resistivity of the conductor. It also shows that the resistance is proportional to the square root of the frequency.

Rearranging Equation 2 so that:

(5) $$I = \left(\frac{P}{R}\right)^{1/2}$$

it follows that with a constant input power to the coil, the current will be inversely proportional to the square root of the resistance.

Since the high frequency resistance is proportional to the square of the frequency, then:

(6) $$I \sim f^{-1/4}$$

Also, since the power loss may be expressed as:

(7) $$P = \frac{E^2}{R}$$

then, assuming a constant input voltage, the following obtains:

(8) $$P \sim \frac{1}{f^{1/2}}$$

Another significant relationship exists with voltage. In an AC circuit this is expressed as the product of current times the impedance. With air core coils of a few number of turns, as in the transducer of this invention, the DC resistance is quite small compared with reactance. Therefore, a close approximation may be made by assuming that:

(9) $$E \simeq IX$$

where:

E=voltage
I=current
X=impedance

The reactance, X, of any coil equals $2\pi f l$, so that the reactance is directly proportional to frequency. Since the current is inversely proportional to the one fourth power of the frequency, Equation 6, then:

(I) $$E \sim f^{3/4}$$

Eddy currents will be produced in the metal diaphragm, positioned adjacent the end of the coil, due to the flux lines that pass into it from the AC excited transducer coil. These eddy currents result in $I^2R$ losses that must be supplied by the coil. These losses, therefore, have the effect of increasing the effective resistance of the coil. The general relationships between power loss, resistance, frequency, and diaphragm material resistivity previously mentioned are applicable.

Figure 7:
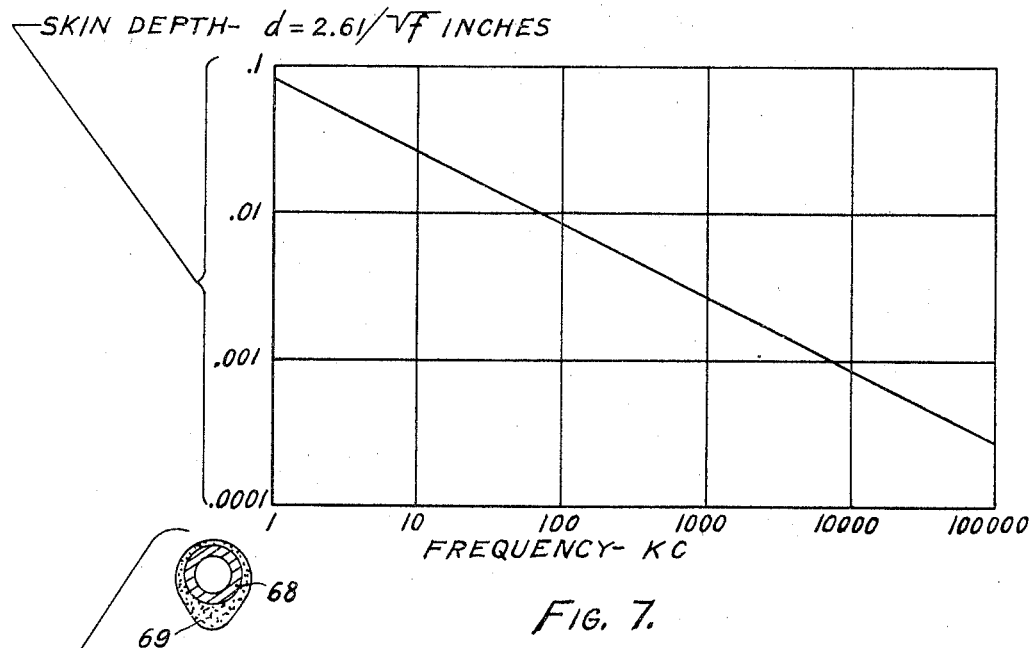
FIGURE 7 is a graphical representation of the depth of current penetration, in inches, as a function of frequency in an electrolytic copper conductor.

The depth of penetration of the eddy currents into the diaphragm likewise follows the relationship expressed in Equation 3. As the frequency of current is raised, increasingly thinner diaphragms may be used and still provide maximum losses due to eddy currents. FIGURE 7 illustrates the depth of penetration or skin depth as a function of frequency for copper. In this case, $$\rho = 1.724 \times 10^{-8}$$

ohm meters and $\mu = 1.26 \times 10^{-6}$ henries/meter for copper at 20° C. Substituting these values in Equation 3 gives:

$$d = 5.62 \, f^{1/2} \text{ cm. or } 2.61 \, f^{1/2} \text{ inches}$$

As can be seen from FIGURE 7, the skin depth in copper at 50 kc. is 0.0118 inch, at 500 kc. the effective penetration has dropped to 0.00375 inch while at 2 mc. the depth is 0.0018 inch.

Figure 8:
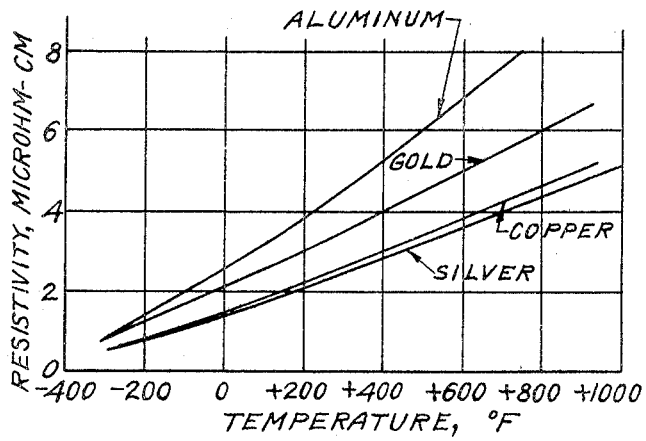
FIGURE 8 is a graphical representation of the resistivity change with temperature for silver, copper, gold and aluminum.

If the diaphragm material is varied from that of copper the skin depth will, of course, vary in relation to any resistivity and permeability change. Since the resistivity of a given material also changes with temperature, the skin depth will vary accordingly. FIGURE 8 shows a plot of this phenomenon for silver, copper, gold and aluminum over a temperature range of −400° F. to 1000° F. In general, the good conductors will give a more linear as well as a smaller resistivity change with temperature than will alloys or poor conductors.

The proximity effect is defined as the distortion of alternating current flow in one conductor due to that of neighboring conductors. In the transducer shown in FIGURES 2 and 10, both the coil and the coil-diaphragm and the coil-slug combinations will contribute to the proximity effect.

In consisting the coil by itself, there will be a redistribution of current in the windings because of the interaction of the magnetic flux produced by adjacent turns. This flux may be that caused by the exciting current as well as that produced by the eddy currents in the nearby windings.

Figure 9:
FIGURE 9 is a qualitative representation of the current redistribution as a result of the proximity of a current carrying conductor to a metal sheet.

When a flat metal plate or diaphragm is brought near to the coil there will also be a redistribution of current in the coil windings and the current density will be crowded on the metal sheet. This redistribution effect has been shown in a qualitative manner and diagrammatically in FIGURE 9 for a single conductor where the conductor is represented by reference numeral 68 and the conducting sheet as 70. The current distribution 69 about conductor 68 and on sheet 70 is distorted into the space between the sheet and conductor.

Because current is now concentrated in certain parts of the conductor rather than uniformly distributed, it can be seen that the power loss or effective coil resistance will be greater than if the diaphragm or adjacent coil windings are not present.

The current redistribution becomes more pronounced as the spacing between the conductor and plate is made smaller as well as when the coil windings are tightly wound.

With a flat, closely wound multi-turn coil, placed with its end surface parallel to the diaphragm surface, the current density will be quite uniform directly under the active coil surface. The current density will taper off quite abruptly, however, where the active surface of the coil ends providing the gap between the coil and diaphragm is kept small. In the transducer of this invention, only the "active area" of the diaphragm directly opposite the coil contributes towards varying the coil losses and consequently the transducer output signal as the diaphragm is moved.

The distributed capacitance in the coil will introduce some loss in the solid dielectrics used in the coil form or core and wire insulation. Bringing the diaphragm close to the coil tends to increase the distributed capacitance and further increases the dielectric loss.

The dielectric loss may be represented by an equivalent series resistance:

(II) $$R_D = \frac{F_p}{2\pi f C}$$

where:

$R_D$ = equivalent series resistance
$F_P$ = power factor of distributed capacity
$f$ = frequency
$C$ = distributed capacitance When considering total coil loss, this equivalent series resistance representing dielectric loss must be added to the total coil resistance. Equation II shows that $R_D$ is inversely proportional to the frequency.

An inductance loss is also sustained by bringing the diaphragm in close proximity to the active surface of the coil producing a reduction in the effective inductance of the coil. This is a result of the metallic sheet acting as a partial non-magnetic shield which interferes with the total flux produced by the coil. Reducing the number of flux lines has the effect of increasing the magnetic reluctance of the coil.

Figure 4:
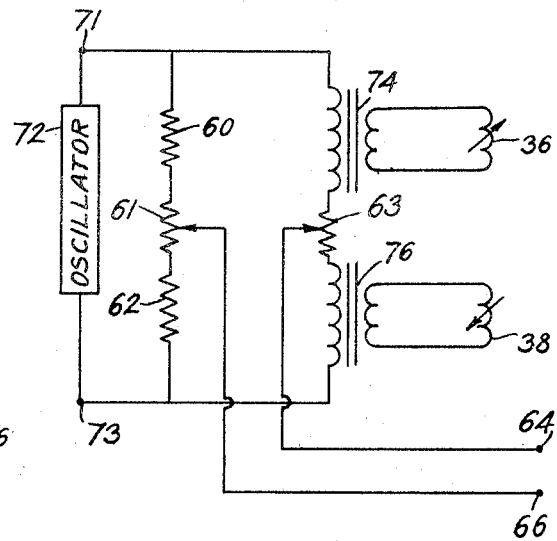
FIGURE 4 is another circuit arrangement including the transducer of FIGURES 1 and 2, transformer coupled for AC output.
Figure 5:
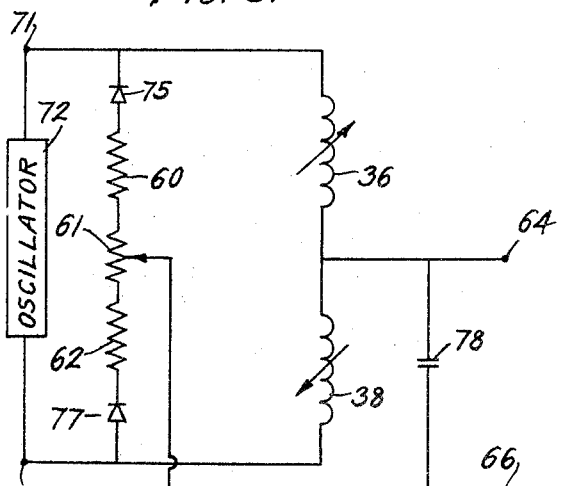
FIGURE 5 is a circuit arrangement including the transducer of FIGURES 1 and 2 modified to provide a DC output.

The variable eddy current transducer of this invention normally would be used as one or more of the active arms of an electrical bridge circuit. The circuits of FIGURES 3, 4 and 5 illustrate several versions of AC bridge circuits for obtaining DC and AC outputs. The circuit of FIGURE 3 illustrates a form of AC bridge with transducer coils 36 and 38 forming the active arms and resistive elements 60 and 62 forming the passive arms. Resistive elements 60 and 62 may be variable to provide for an electrical balance of the transducer. In certain cases it may be desirable to substitute for one of the two transducer coils an inactive arm or fixed coil diaphragm arrangement. A suitable resistance, capacitance, inductance or suitable combination of same may also be substituted for one of the coils as only a single coil is required to produce an output signal from such a circuit. An oscillator 72 is connected across the bridge input terminals 71 and 73 and when arm elements 36, 38, 60 and 62 are balanced, the output appearing between terminals 64 and 66 will be zero. When the losses in coils 36 and 38 are varied by movement of diaphragm 22 closer to one and away from the other, this unbalance produces a voltage across terminals 64 and 66 as an output signal.

FIGURE 4 illustrates a modified bridge circuit where the transducer arms are connected to the secondary windings of saturable transformers 74 and 76 and present variable impedance loads thereto. The primary windings are connected as two active arms of the bridge. This circuit has advantages where it is desired to change the impedance levels between that of the transducer and the output of the bridge across terminals 64 and 66. Where air core coils are used in the transducer, the impedance may be on the order of 10–50 ohms, which is suitable for long cable runs. Connecting such a transducer in the circuit of FIGURE 4 would require much less driving power from oscillator 72 than required for the circuit of FIGURE 3.

The circuit shown in FIGURE 5 illustrates a further circuit modification of a bridge for obtaining a DC bridge output. The output across terminals 64 and 66 is polarity sensitive and will reverse polarity depending on which direction the transducer is unbalanced. The diodes 75 and 77 provide for sampling of the bridge unbalance every one-half cycle of the input supply for presentation at output terminals 64 and 66 as a DC voltage proportional to transducer unbalance. The capacitor 78 serves to filter the half wave DC output and may be replaced by a more sophisticated filter for improved high frequency response.

Null balancing in the AC bridge circuits of FIGURES 3 and 4 is accomplished by means of variable resistors 61 and 63 with 61 being used to balance out the resistive component and 63 being used to obtain a reactive balance between the two transducer arms. With the DC output circuit of FIGURE 5 only one resistor 61 is needed to obtain a zero DC output.

Tests were conducted to verify the theoretical considerations. It was found that the thickness of the diaphragm required for maximum output at a given frequency was considerably less than that predictable solely from the skin depth equations.

The effect of different diaphragm materials is illustrated by the data in Table I which shows the relative output voltages obtained from the transducer of FIGURES 1 and 2 with different materials used for the diaphragm. In each case, the diaphragm is at least three "skin depths" in thickness at 1 megacycle input frequency. The tests were all made with a .005″ total change in the diaphragm-to-coil air gap, from a .006″ gap to a .001″ gap, and the coils consisted of 80 turns of #34 single enamel wire to form a coil .040″ thick and ⅜″ in diameter.

TABLE I

| Material | Alloy | Thickness, inches | Output, $E_o$ | Resistivity, ohm-m.$\times 10^8$ |
| --- | --- | --- | --- | --- |
| Silver | 99.9% | .009 | .160 | 1.59 |
| Copper | 99.9% | .007 | .158 | 1.71 |
| Aluminum | 99.0% | .0095 | .158 | 2.92 |
| Brass | 32% Cu, 68% Zn | .042 | .138 | 6.4 |
| Beryllium copper | #25 | .010 | .138 | 4.82 |
| Phosphor bronze | Type A | .007 | .135 | 9.6 |
| Copper-silver | 35% Ag, 65% Cu | .010 | .126 | |
| Titanium | 99.0% | .033 | .090 | 55.0 |
| Stainless steel | #321 | .026 | .088 | 72.0 |
| Invar | 36% Ni, 64% Fr | .013 | −.022 | 81.0 |
| Monel | | .031 | −.017 | 53.2 |

The input voltage for the results shown in Table I was 3 volts. As shown by the table, the greatest output is obtained with the material having the greatest conductivity and lowest resistivity. Such materials will introduce the greatest $I^2R$ losses into the circuit.

As previously pointed out, for maximum output of a transducer of this invention, the diaphragm material must have a permeability not significantly greater than about one, i.e., be non-magnetic. Two materials, Invar and Monel, having approximate permeabilities of 5000 and 2000 respectively are included in the table for comparison. The output with these materials is shown as a reverse polarity, to indicate a slight overall gain being produced in the circuit by these materials, rather than a loss, as the air gap is reduced which is due to increasing the coil inductance.

The foregoing skin depth considerations indicate that at a given frequency a diaphragm of less than a given thickness will result in less than maximum transducer output. Also, a diaphragm thicker than the given thickness will produce no greater output. Further, the minimum diaphragm thickness for maximum output should decrease as the input frequency increases.

Tests were carried out to verify these findings. Two open ended coil forms were wound with 120 turns of #36 single enamel wire. The circuit was that of FIGURE 3 with resistances 60 and 62 each being 25 ohms. The input signal to the bridge from oscillator 72 was maintained at one volt.

The output voltage $E_o$ for a given diaphragm thickness and frequency was determined by first placing a .005″ Mylar spacer between each coil and its diaphragm and subtracting this output voltage from the output voltage obtained when the spacer is removed from between one coil and its diaphragm where the coil is in direct contact therewith. The diaphragm comprised one or more .00113″ thick electrolytic sheets of copper.

The minimum diaphragm thickness to produce maximum output voltage at various input frequencies has been determined. It was found that the diaphragms could be considerably thinner than that calculated to achieve maximum output at a particular frequency. It was also noted that the output is greater at the higher frequencies.

Figure 10:
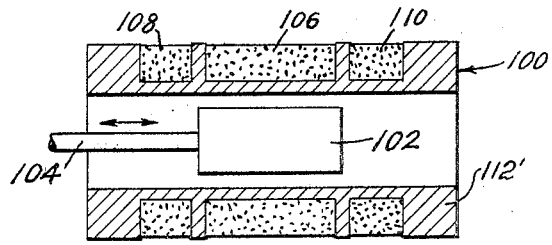
FIGURE 10 is an elevational view in cross section of a linear position differential type transducer according to the present invention.
Figure 11:
FIGURE 11 is an end view of the slug member of FIGURE 10 showing the preferred conducting shell construction.

Referring now to FIGURE 10 there is shown a view in elevation, partly in cross-section, of a variable impedance linear position transducer 100 constructed in accordance with the teaching of the present invention set forth and claimed in this application. In the linear position transducer, the eddy currents are produced in the centrally positioned movable slug 102. The slug positioning rod 104 is attached directly to the structure whose movement is to be measured. The linear position transducer is not limited to measuring the motion only of a non-magnetic electrically conductive element such as diaphragm 22 and the like in applicant's copending application, but measurements can be made of very small and odd-shaped structure surfaces.

In the transducer 100, the primary winding 106 and the two secondary windings 108 and 110 are wound on a non-magnetic, dielectric coil form 112′. The coil form 112′ may be of a ceramic material. The coil windings are closely coupled, are preferably symmetrical and are typically of small diameter. The movable slug 102 may therefore be quite small and lightweight. The slug 102, as shown, comprises a thin, non-magnetic metal sleeve 114 supported on a core 116 of a non-magnetic, dielectric material, which again may be of a ceramic material. The thin sleeve 114 need be only some lightweight metal, such as aluminum. If weight is not important, the slug may be of solid metal.

When the transducer 100 is energized by a signal developed across the primary winding 106 as from a high frequency alternating current generator, a change in the position of slug 102 results in a change in the AC resistance or power loss relationship between the secondary coils 108 and 110 which can be detected in an appropriate output circuit as a function of the position and change of position of slug 102 or any element to which the slug is motion responsive.

Figure 12:
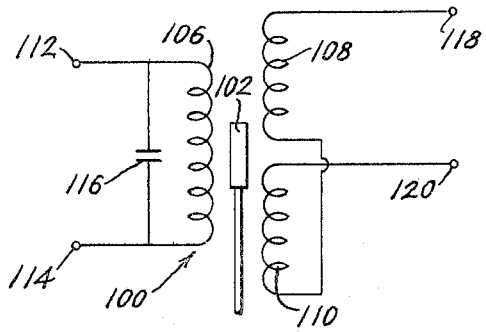
FIGURE 12 is a circuit arrangement including the transducer of FIGURE 10 with the secondary windings connected for AC output in series opposition.
Figure 13:
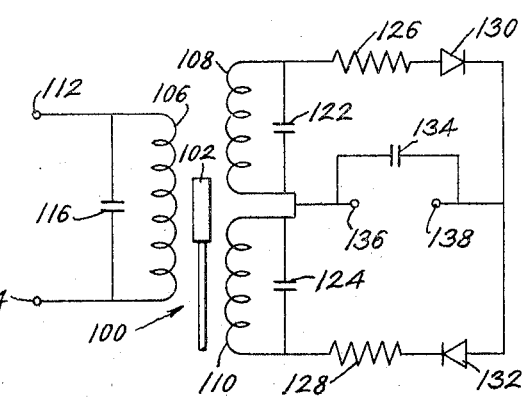
FIGURE 13 is another circuit arrangement including the transducer of FIGURE 10 with the secondary windings connected in an output circuit providing a DC output voltage.
Figure 14:
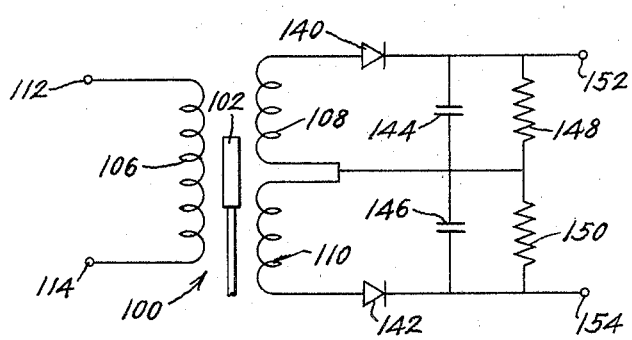
FIGURE 14 is still another circuit arrangement including the transducer of FIGURE 10 in a modified output circuit providing a DC output voltage; and, FIGURE 15 is a view in elevation of a modified slug construction of segmentated configuration.

The circuits of FIGURES 12–14 are representative of those which may be used with the transducer of the present invention. The circuit of FIGURE 12 provides an AC output voltage while the circuits of FIGURES 13 and 14 provide a DC output voltage. In the circuit of FIGURE 12, secondary coil 108 is connected in series opposition with secondary coil 110 in bucking relation thereto. An alternating current generator is connected to input terminals 112 and 114 of the transducer 100 of FIGURE 12. A peaking capacitor 116 may be connected in parallel with the primary winding 106 to resonate the input circuit at the operating frequencies. When slug 102 is positioned at the null position, the output voltage across output terminals 118 and 120 will be substantially at zero potential. Movement of slug 102 away from the null position in one direction produces an output voltage while movement of slug 102 away from the null position in the other direction produces an output voltage opposite in phase to the first produced voltage.

The circuit of FIGURE 13 provides a DC output voltage across output terminals 136 and 138 thereof. The primary winding 106 has an AC generator connected to input terminals 112 and 114. A peaking capacitor 116 may be connected in parallel therewith. In like manner, the secondary coils 108 and 110 may have peaking capacitors 122 and 124 in parallel respectively therewith for peaking the secondary coils at the operating frequencies for increased sensitivity. The secondary windings 108 and 110 are connected in series and output terminal 136 connects the common juncture thereof. The other ends of secondary coils 108 and 110 are respectively connected serially through load resistors 126, 128 and diodes 130, 132 to output terminal 138. A filter capacitor 134 is connected across output terminals 136 and 138 to provide appropriate filtering action. The circuit of FIGURE 13 provides a DC output signal which is essentially a linear function of the movement of slug 102.

The circuit of FIGURE 14 also provides a DC output voltage across output terminals 152 and 154. The primary winding 106 is connected across an AC generator via terminals 112 and 114. The secondary windings 108 and 110 are connected in series with the outer ends thereof being connected to output terminals 152 and 154 via diodes 140 and 142 respectively. The common junction of secondary coils 108 and 110 is connected to the output terminals 152 and 154 via parallel load resistors 148 and 150 respectively. Filter capacitors 144 and 146 are respectively connected across load resistors 148 and 150.

The transducer according to this invention is particularly adapted for use with and has many advantages for nuclear applications. The transducer can be constructed entirely of inorganic and nonmagnetic materials such as aluminum and aluminum oxide which are highly resistant to intense nuclear radiation and present a low cross-section to X-ray energies. The nonmagnetic slug permits operation over wide temperature ranges since non-linear permeability changes and curie temperatures are not a consideration. Further, the use of a nonmagnetic slug permits a high frequency input drive, in the megacycle range, to be employed, making possible a high frequency response system capability. Also, the transducer exhibits an inherently low impedance which is important in a nuclear-hardened device.

Figure 15:
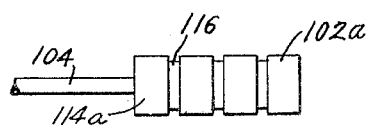

Reference is now made to a slug 102a of modified construction in FIGURE 15. The non-magnetic, electrical conducting sleeve 114a consists of a plurality of sleeves of shortened length mounted on core 116 at spaced intervals and electrically isolated from each other. It has been found that the slug configuration of FIGURE 15 or a solid metal slug of similar configuration permits a greater range of movement of the slug while maintaining an even greater linearity of the output signal.

While there have been described what at present are considered to be the preferred embodiments of this invention, it will be obvious to those skilled in the art that various changes and modifications may be made therein without departing from the invention. It is aimed therefore in the appended claims to cover all such changes and modifications which fall within the true spirit and scope of the invention.

What is claimed is:

1. A variable impedance linear position transducer comprising a primary exciting air core coil and a pair of secondary air core coils in aligned concentric relation, said secondary coils being electrically connected to develop an output signal and a non-magnetic, electrical conducting slug devoid of magnetizable material movably disposed within the primary and secondary coils wherein the output signal developed is a function of the positioning of the slug with respect to the secondary coil.

2. The transducer according to claim 1 wherein the non-magnetic slug comprises a non-magnetic, dielectric core and a non-magnetic, electrical conducting sleeve supported on said core.

3. The transducer according to claim 2, wherein a plurality of non-magnetic, electrical conducting sleeves are positioned on said core in spaced electrically isolated fashion.

4. A variable impedance linear position transducer which comprises a primary winding for generating an electro-magnetic field, a source of AC signals connected to apply excitation currents to said primary winding, first and second secondary windings, means for connecting said secondary windings in electrical series, and a slug member of non-magnetic, electrical conducting material devoid of magnetizable material, said first and second secondary windings being positioned with respect to the electro-magnetic field generated by said primary windings so that the impedance of said first and secondary windings are equal when said slug is supported in a null position.

5. A variable impedance linear position transducer which comprises a primary winding for generating an electro-magnetic field, a source of AC signals connected to apply excitation currents to said primary winding, first and second secondary windings, means for connecting said secondary windings in electrical series, and a slug member of non-magnetic electrical conducting materials devoid of magnetizable material, said first and second secondary windings being positioned with respect to the electro-magnetic field generated by said primary windings so that an equal amount of power loss occurs in each of the secondary windings when said slug is supported in a null position.

6. The transducer of claim 5 including means for supporting said slug for movement in said electro-magnetic field from said null position in response to the movement to be detected.

7. The transducer of claim 5 wherein the non-magnetic slug comprises a non-magnetic, dielectric core and a non-magnetic, electrical conducting sleeve supported thereon.

8. The transducer of claim 7 wherein a plurality of non-magnetic, electrical conducting sleeves are positioned on said core in spaced electrically isolated manner.

9. A variable impedance linear position transducer which comprises a primary winding supported upon a non-magnetic, dielectric core, a source of high frequency current connected to apply excitation current to said primary winding, first and second secondary windings electrically connected to provide an output circuit, a non-magnetic, electrical conducting movable slug devoid of magnetizable material disposed to provide a change in eddy current losses in said primary and said secondary windings on movement of said slug and adapted to produce an output signal in said output circuit indicative of the positioning of said movable slug with respect to said first and second secondary windings.

10. The transducer according to claim 9 wherein the non-magnetic slug comprises a non-magnetic dielectric core and a non-magnetic electrical conducting sleeve supported thereon in concentric relation.

11. The transducer according to claim 10, wherein a plurality of non-magnetic, electrical conducting sleeves are mounted on said core in spaced, electrically isolated fashion.

12. The transducer of claim 4 wherein the non-magnetic slug comprises a nonmagnetic, dielectric core and a non-magnetic, electrical conducting sleeve supported thereon.

References Cited

UNITED STATES PATENTS

| 2,325,279 | 7/1943 | Schaper | 323—90 X |
| 2,568,588 | 9/1951 | MacGeorge | 336—136 X |
| 3,356,933 | 12/1967 | Stettler | 323—51 |

WARREN E. RAY, Primary Examiner

U.S. Cl. X.R.
336—136; 340—199